United States Patent
Allen

[11] 3,797,345
[45] Mar. 19, 1974

[54] CONVEYORIZED SHEET CUTTER
[75] Inventor: Philip Allen, Radnor, Pa.
[73] Assignee: Charles Beck Machine Corporation, King of Prussia, Pa.
[22] Filed: Mar. 21, 1972
[21] Appl. No.: 236,649

[52] U.S. Cl. ............... 83/175, 83/326, 83/353, 83/428, 83/443
[51] Int. Cl. ............................................. B26d 7/14
[58] Field of Search ............ 83/175, 176, 326, 353, 83/443, 428

[56] References Cited
UNITED STATES PATENTS

| 3,704,642 | 12/1972 | Dryon | 83/326 X |
|---|---|---|---|
| 2,503,353 | 4/1950 | Pugh | 83/175 X |
| 3,587,376 | 6/1971 | Hirano | 83/175 X |
| 3,641,854 | 2/1972 | Keesling | 83/175 X |
| 2,787,323 | 4/1957 | Van Antwerpen et al. | 83/326 |
| 3,485,128 | 12/1969 | Siegenthaler | 83/428 X |
| 3,673,905 | 7/1972 | Kono | 83/175 |

*Primary Examiner*—Willie G. Abercrombie
*Attorney, Agent, or Firm*—Sperry and Zoda

[57] ABSTRACT

An improved conveyorized sheet cutter is herein described for cutting a plurality of stacked sheets of thermoplastic material, and the like. A first conveyor is provided for moving stacked sheets of material along a first conveyorized path and an elongated tensioning block is disposed beneath the sheets of thermoplastic material to urge upwardly against the moving material, so as to tension the material. The tensioning block may be formed with a channel for receiving a razor-blade which may be mounted on a second conveyor disposed for movement along the channel, for cutting sheet material held taut across the channel. The first and second conveyor systems are driven through a common drive shaft so as to be mechanically synchronized. As a result thereof, the angle of cutting bias necessary to cut squared off sheets of moving material is constant, regardless of the speed of sheet material travel.

In one form of the invention, a plurality of cords may be provided to extend outwardly from leading and trailing edges of the tensioning block for the purpose of supporting the moving sheet material before and immediately after the razor-blade has cut the sheet. The plurality of cords may take the form of a continuous loop having a resilient member incorporated therein for the purpose of maintaining tension in each of the plurality of cords.

5 Claims, 5 Drawing Figures

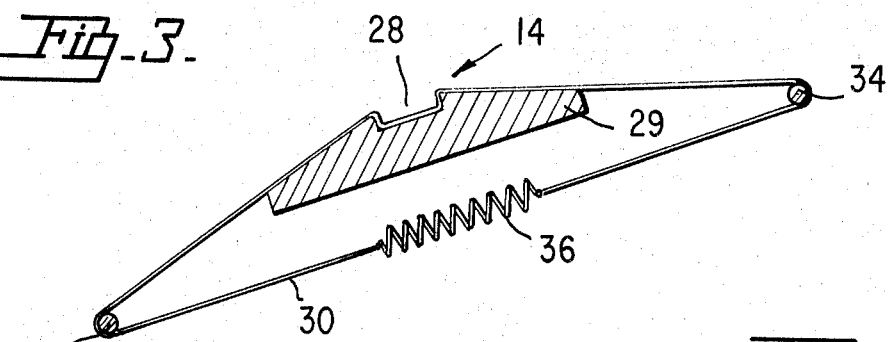
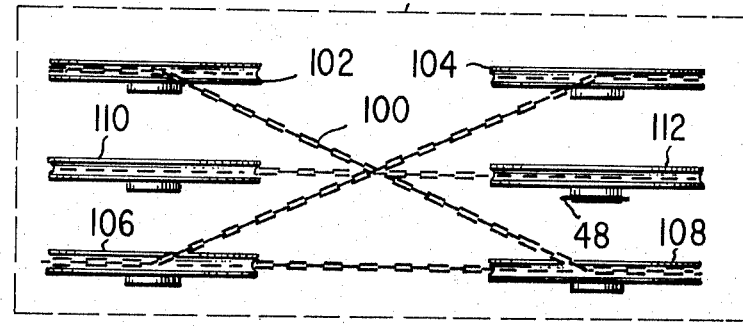
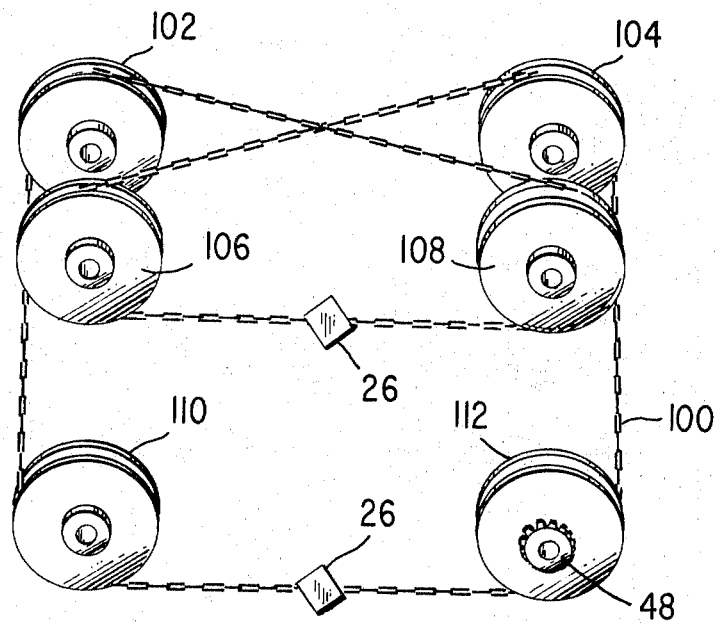

CONVEYORIZED SHEET CUTTER

BACKGROUND

The present invention relates to cutting apparatus and, more specifically, relates to conveyorized apparatus for simultaneously cutting multiple, stacked sheets of thermoplastic, while they are moving, without fusing the cut edges thereof by the cutting process.

With the advent of thermoplastic sheet materials, such as high-density polyethylene, and, further, in view of the common practice of supplying rolls of such thermoplastic sheet material in multiple ply or tubular form; so that, in order to cut sheets of the material, several plies must be cut simultaneously; it has become necessary to develop new sheet cutting techniques.

More particularly, when several plies of certain thermoplastic sheet materials are cut, simultaneously, the cutting edge of the cutting element has a tendency to fuse the cut edges of the various plies together so that sheets stick together along the cut edges thereof.

Accordingly, when sheets of thermoplastic material are "blocked" or fused together in the aforementioned manner, problems are presented during the processing operations, downstream in the assembly line from the cutting operation.

Accordingly, it would be advantageous if a machine were provided which would cut a stack of sheets of thermoplastic material without fusing the cut edges together.

OBJECTS AND SUMMARY OF THE INVENTION

It is therefore an object of the present invention to provide an improved sheet cutting apparatus.

It is another object of the present invention to provide a sheet cutting apparatus which is capable of cutting stacked sheets of thermoplastic material without fusing the cut edges thereof.

It is still another object of the present invention to provide an improved thermoplastic sheet cutting apparatus which is sufficiently uncomplicated to facilitate manufacture.

It is yet another object of the present invention to provide a conveyorized sheet cutting apparatus which may be installed in existing sheet cutting installations.

It is a further object of the present invention to provide an improved conveyorized sheet cutting apparatus which is of such a configuration as to facilitate the maintenance thereof.

It is still a further object of the present invention to provide a conveyorized sheet cutting apparatus which is operable to cut "squared off" sheets of thermoplastic material, using a single angle of cutting bias for any machine speed.

It is yet a further object of the present invention to provide an improved conveyorized sheet cutting apparatus which is operable to cut a moving stack of thermoplastic sheet material while maintaining tension on the material for forming an accurate, clean-edge cut.

It is a major object of the present invention to provide an improved sheet cutting apparatus for cutting multiple, stacked sheets of thermoplastic material, and the like, which apparatus solves many of the problems confronting industry today.

BRIEF DESCRIPTION OF THE DRAWINGS

While the invention is particularly pointed out and distinctly claimed in a concluding portion of the specification, the preferred embodiment of the present invention is set forth in the following detailed description which may be best understood when read in connection with the accompanying drawings, in which:

FIG. 3 is a vertical cross sectional view of a tensioning element of the present invention;

FIG. 4 is a top plan view of a chain drive arrangement for transporting a cutting element across sheets of material to be cut; and FIG. 5 is a generally vertical schematic view of the chain and sprocket arrangement set forth in FIG. 4.

DETAILED DESCRIPTION

Figure 1:
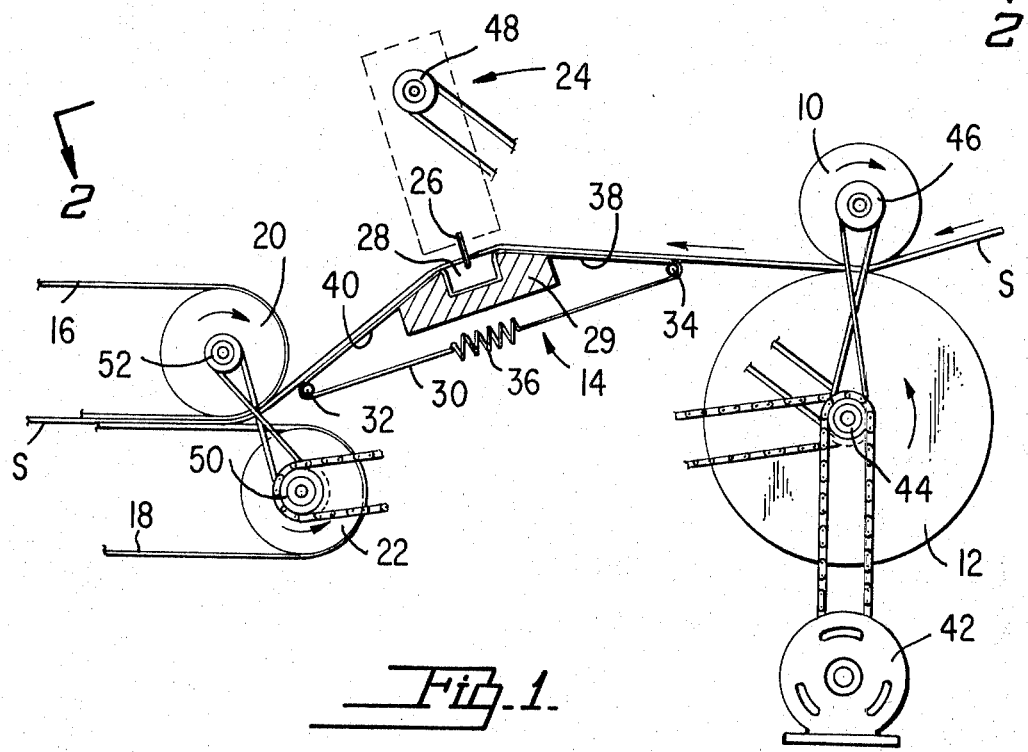
FIG. 1 shows a schematic side elevation view of the preferred embodiment of the present invention.

Referring now to the drawings in which like numerals are used to indicate like parts throughout the various views thereof, FIG. 1 is a schematic view in side elevation.

Referring now to FIG. 1, stacked sheets S of a high density polyethylene material are transported along a first conveyorized path by means of upper and lower feed rollers 10 and 12, respectively.

The material is then moved over a tensioning arrangement 14 and, thereafter, is moved on to take-up tapes 16 and 18 which, in turn, are driven by pulley members 20 and 22, respectively.

A cutting element assembly 24, may be disposed transversely of the path taken by the moving sheet material and may present a transversely moving chain provided with a holder carrying a razor blade 26. A transversely extending channel 28 may be formed in an upper surface of a block member 29, of the overall tensioning arrangement 14, for receiving the cutting blade 26, as the cutting blade 26 moves transversely of the moving sheet material, during a cutting process.

A plurality of cord members 30 may be disposed over an upper surface of the block 29 and may be further disposed to aligned along the path of sheet material movement by disposing the cords 30 over transversely extending and spaced rods 32 and 34. The cords 30 may comprise a low friction material such as monofilament. The monofilament cords 30 may be secured to the surfaces of the block 29 defining the transversely extending channel 28 in any suitable way so that each cord, which may be of a continuous nature, will not be cut by the cutting element 26, during its transverse movement.

Additionally, a resilient member, such as a spring 36 may be connected in the continuous loop of the monofilament cord 30 to tension the cord. In this manner, the upper segments 38 and 40 of each continuous loop of each monofilament cord 30 present low friction supporting surfaces for guiding the sheets of material to the cutting blade 26 and, thereafter, to the take-off tapes 16 and 18.

A single drive motor 42 may be provided and may be operatively connected with a main drive sprocket 44. For purposes of illustration, the main drive sprocket 44 is shown as being mounted on the shaft supporting the feed roll 12. Of course, this need not be the case, and the main drive shaft may be a separate element, onto itself.

The main drive sprocket 44, in turn, may be automatically, operatively connected with an upper feed roller sprocket 46, a cutting element drive sprocket 48 and a lower tape driving pulley sprocket 50. The upper tape driving pulley 20 may be driven by a connection between the lower tape driving pulley sprocket 50 and an upper tape driving pulley sprocket 52.

Due to the engineering concept embodied in the schematic view of FIG. 1, all the rollers, pulleys and the cutting elements may be directly mechanically synchronized.

In order to cut squared-off sheets of material, when cutting material while it is moving, it is necessary to cut the material transversly in a direction inclined with respect to the direction of movement the material. Accordingly, the element 24 may be biased in the manner set forth in FIG. 2. Furthermore, the bias angle may be made adjustable by the provision of an adjustable mounting arrangement for the cutting element 24.

It is important to note that, since all the moving elements of the disclosed arrangement are directly mechanically synchronized, the same bias angle may be used for any machine speed. Accordingly, the complexity of existing machines, utilizing transversely moving cutting elements, may be greatly simplified.

Figure 2:
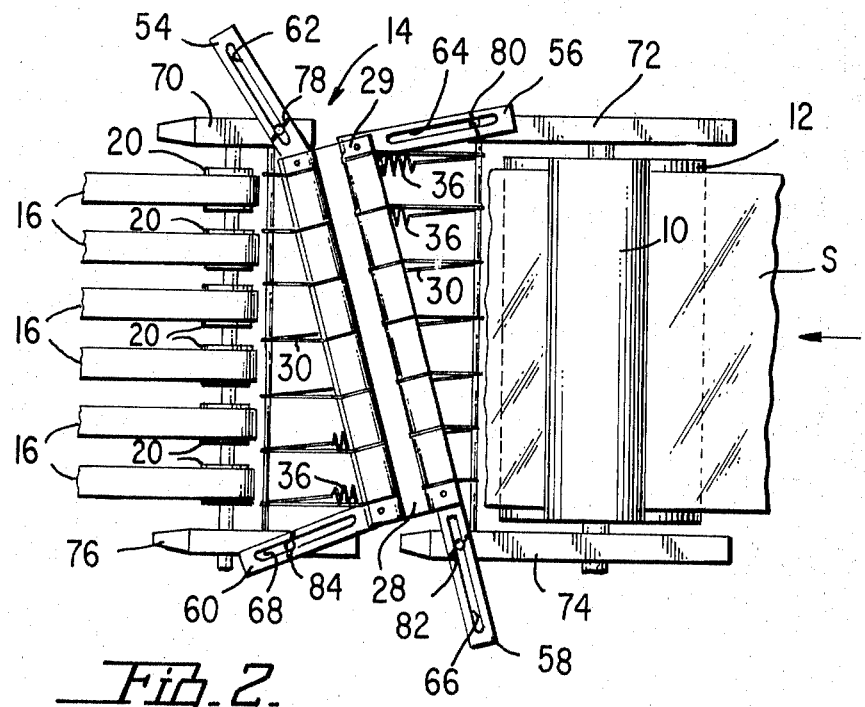
FIG. 2 is a top elevation view taken along line 2—2 of FIG. 1.

Referring now to FIG. 2, the schematic arrangement of FIG. 1 is shown along line 2—2. It will be noted, that each of the monofilament cords 30 may be held in tension by means of a spring, or the like, and that each cord may comprise a continuous loop held in tension by means of the rods 32 and 34.

For purposes of illustration, the block member 29 of FIG. 2, is shown to be adjustably mounted by pivotable arms 54,56,58 and 60. The arms, in turn, may be formed with elongated slots 62,64,66 and 68, respectively. Surfaces 70,72,74 and 76, supporting the arms 54,56,58 and 60, respectively, may be disposed at an incline to support the Of 29 at an angle, as shown in FIG. 1. 72,74 course, this arrangement is shown for the purposes of illustration only, and virtually any kind of conventional adustable support may be utilized.

The arms 54,56,58 and 60 may be secured to the incline surfaces 70, 72, 74 and 76 by means of wing-nuts, or the like, 78,80,82, and 84.

Referring now to FIG. 3, the tensioning element 14 is shown in vertical cross sectional view.

The block element 29 may be formed of wood, or any suitable material, and may be formed of a generally triangular cross sectional configuration.

It should be noted, that the cord 30 may be secured to the surfaces of the block 29 defining the channel 28 to insure that the cutting element 26 would not sever the cords 30.

In this connection, the cord 30 may be of a continuous loop configuration or, may be a strand with each terminal end, thereof, attached to either a leading or a trailing edge of the block member 29.

Referring now to FIGS. 4 and 5, the conveyor system for moving the cutting element 26 transversely along the channel 28 is diagrammatically illustrated.

A link chain 100, or the like, may be carried on a sprocket system comprising four upper sprockets 102,104,106 and 108. Additionally, a lower idler sprocket 110 and a lower drive sprocket 112 may be provided.

The entire assembly of sprockets may be housed within an enclosure 114 and the drive sprocket 112 may be, in turn, driven by the motor 42 (see FIG. 1) through the main drive sprocket 44 and the sprocket 48 connected with the drive sprocket 112.

The chain 100 may have one or more razor blade holders attached thereto to support razor blade type elements and, due to the relatively long length (e.g. 20') of the chain 100, high linear speeds may be imparted to the cutting elements 26 as they pass along the channel 28 formed in the tensioning block 29 (see FIG. 3).

In order to handle such a length of chain, the chain may be operatively supported in the, generally, figure eight configuration shown in FIG. 5.

It can thus be seen that the sheet cutting apparatus, described herein, solves many of the problems confronted by the industry today.

The present apparatus consists of a conveyorized, improved, moving sheet cutter which is especially useful for cutting stacked or double sheets of thermoplastic material, or the like, which tends to fuse together along the cut edge, under the pressure of a cutting knife.

It has been found that, due to the operation of apparatus according to present invention, such sheets may be cut in such a manner as to be easily separated by forced air, or the like, after being cut.

The apparatus according to present invention is remarkably uncomplicated and easy to manufacture. Additionally, the present invention may be installed in existing equipment and is easy to maintain.

Since the apparatus according to present invention incorporates a unique tensioning element, the moving sheet material is maintained under sufficient tension for accurately and cleanly cutting the material with a fast moving blade.

Since the various sprockets, pulleys, and rollers of the present invention are driven by a single power source, and through a single driving shaft, all these elements may be precisely mechanically synchronized so as to insure simplicity of operation. In this connection, the same "bias of cutting" angle may be utilized for a specified length of sheet, regardless of the machine's speed.

SCOPE OF THE INVENTION

While what has been described herein as an embodiment of the present invention, it is of course understood that various modifications and changes may be made therein without departing from the invention. Accordingly, it is intended to cover in the following claims all such modifications and changes as may fall within the true spirit and scope of the present invention.

I claim:

1. Apparatus for severing a travelling web of material transversely into sections of predetermined length comprising means for moving said web longitudinally, a cutting assembly extending transversely of said web of material and including tensioning means bearing against one surface of said web and formed with a slot therein facing said web and a cutter movable transversely of said web of material across the opposite surface of said web parallel to said tensioning means and having a cutting portion thereof extending into said slot to sever the web transversely upon movement of the cutter across said web, means for coordinating the speed of travel of said web of material and said cutter at all speeds of travel of said web, said cutting assembly being movable with respect to said web to a selected angle with respect to the direction of travel of said web to cause said web to be severed transversely at right angles to the direction of movement of said web.

2. Apparatus according to claim No. 1, wherein ord means extends from leading and trailing edges of said tensioning member generally in the direction of said first path, to support moving sheet material immediately before and after said material is cut.

3. Apparatus according to claim No. 2, wherein said cord means comprises a plurality of low friction cords extending forwardly from said tensioning member to a first transversely extending bar and, then back upon itself to a second transversely extending bar and, again, back upon itself to the leading edge of said tensioning means, to complete a loop.

4. Apparatus according to claim No. 3, wherein said cord means is provided with yieldable resilient means.

5. Apparatus as defined in claim 1 wherein there are feed rolls located on one side of said cutting assembly and take-up rolls located on the opposite side of said assembly and said tensioning means is displaced with respect to said feed rolls and take-up rolls so as to place said web under tension as it travels over the tensioning means and across the slot therein.

* * * * *

UNITED STATES PATENT OFFICE
CERTIFICATE OF CORRECTION

Patent No. 3,797,345                   Dated March 19, 1974

Inventor(s) Philip Allen

It is certified that error appears in the above-identified patent and that said Letters Patent are hereby corrected as shown below:

Column 3, line 40 the word "Of" before the number 29 should be the word --element--

Column 3, line 41 change "72, 74" to the word --Of--

Column 5, line 7 change the word "ord" to --cord--

Signed and sealed this 13th day of August 1974.

(SEAL)
Attest:

McCOY M. GIBSON, JR.                C. MARSHALL DANN
Attesting Officer                   Commissioner of Patents